(12) United States Patent
Statchuk

(10) Patent No.: US 7,873,670 B2
(45) Date of Patent: Jan. 18, 2011

(54) METHOD AND SYSTEM FOR MANAGING EXEMPLAR TERMS DATABASE FOR BUSINESS-ORIENTED METADATA CONTENT

(75) Inventor: Craig Statchuk, North Gower (CA)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 11/494,936

(22) Filed: Jul. 28, 2006

(65) Prior Publication Data

US 2007/0055691 A1 Mar. 8, 2007

(30) Foreign Application Priority Data

Jul. 29, 2005 (CA) .................................. 2514165
Apr. 28, 2006 (CA) .................................. 2545237

(51) Int. Cl.
G06F 17/30 (2006.01)
(52) U.S. Cl. ....................... 707/796; 707/804
(58) Field of Classification Search ................. 707/796
See application file for complete search history.

(56) References Cited

U.S. PATENT DOCUMENTS

| | | | |
|---|---|---|---|
| 5,940,821 A | 8/1999 | Wical | |
| 5,963,940 A | 10/1999 | Liddy et al. | |
| 6,026,388 A | 2/2000 | Liddy et al. | |
| 6,038,560 A | 3/2000 | Wical | |
| 6,161,084 A * | 12/2000 | Messerly et al. | 704/9 |
| 6,363,378 B1 | 3/2002 | Conklin et al. | |
| 6,405,190 B1 | 6/2002 | Conklin | |
| 6,460,034 B1 | 10/2002 | Wical | |
| 6,510,425 B1 * | 1/2003 | Okamoto et al. | 1/1 |
| 6,526,440 B1 | 2/2003 | Bharat | |
| 6,609,123 B1 | 8/2003 | Cazemier et al. | |
| 6,842,761 B2 | 1/2005 | Diamond et al. | |
| 6,924,828 B1 | 8/2005 | Hirsch | |
| 6,954,750 B2 | 10/2005 | Bradford | |
| 6,963,867 B2 | 11/2005 | Ford et al. | |
| 7,231,405 B2 | 6/2007 | Xia | |
| 7,251,637 B1 * | 7/2007 | Caid et al. | 706/15 |
| 7,266,548 B2 | 9/2007 | Weare | |
| 7,272,610 B2 | 9/2007 | Torres | |
| 7,472,113 B1 | 12/2008 | Watson et al. | |
| 7,571,157 B2 | 8/2009 | Chowdhury et al. | |
| 7,689,615 B2 | 3/2010 | Burges et al. | |
| 2001/0054034 A1 * | 12/2001 | Arning et al. | 707/1 |
| 2003/0110158 A1 | 6/2003 | Seals | |
| 2004/0024739 A1 | 2/2004 | Copperman et al. | |
| 2004/0148278 A1 * | 7/2004 | Milo et al. | 707/3 |
| 2004/0230572 A1 * | 11/2004 | Omoigui | 707/3 |
| 2005/0165718 A1 | 7/2005 | Fontura et al. | |
| 2005/0192955 A1 | 9/2005 | Farrell | |
| 2005/0246322 A1 | 11/2005 | Ravikumar et al. | |
| 2006/0053151 A1 | 3/2006 | Gardner et al. | |

(Continued)

Primary Examiner—Tim T. Vo
Assistant Examiner—Anh Tai V Tran
(74) Attorney, Agent, or Firm—Shumaker & Sieffert, P.A.

(57) ABSTRACT

An example management system comprises an indexing engine, an index store and an example engine. The indexing engine indexes content of source business oriented metadata. The indexing engine has a content scanner for reading the business oriented metadata, and building a content index of the business oriented metadata. The index store stores the content index of the business oriented metadata. The example engine manages logical associations of terms in a query using the content index.

23 Claims, 5 Drawing Sheets

U.S. PATENT DOCUMENTS

2006/0155685 A1 7/2006 Grim et al.
2006/0212461 A1 9/2006 Meysman
2006/0265364 A1 11/2006 Keith, Jr.
2007/0055680 A1 3/2007 Statchuk
2008/0027971 A1 1/2008 Statchuk
2008/0243830 A1 10/2008 Abhyanker

* cited by examiner

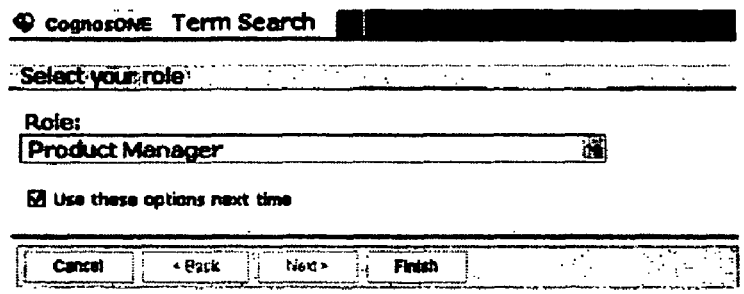

Figure 7

Staff Details: United States, Canyon Mule Backpack

| | | | | | |
|---|---|---|---|---|---|
| 1988 | Alisia Wilcox | Outdoor Gear Co-op | $5,841.36 | $973.56 | $5,841.36 |
| | Ashley McCormick | By A Thread | $5,226.48 | $871.08 | $5,226.48 |
| | | Jack and Jill Climbing School & Supplies | $2,613.24 | $435.54 | $2,613.24 |
| | Bart Scott | By A Thread | $5,072.76 | $845.46 | $5,072.76 |
| | Chad Michaels | Outdoor Gear Co-op | $6,148.80 | $1,024.80 | $6,148.80 |
| | Dale Fowler | Donovan's Sports | $2,305.80 | $384.30 | $2,305.80 |
| | | Falcon Outfitters | $3,381.84 | $563.64 | $3,381.84 |
| 1989 | Alisia Wilcox | Outdoor Gear Co-op | $5,841.36 | $973.56 | $5,841.36 |
| | Ashley McCormick | By A Thread | $5,226.48 | $871.08 | $5,226.48 |
| | | Jack and Jill Climbing School & Supplies | $2,613.24 | $435.54 | $2,613.24 |
| | Bart Scott | By A Thread | $5,072.76 | $845.46 | $5,072.76 |

Figure 8

Staff Details: 2004, United States, Canyon Mule Backpack

| | | | | |
|---|---|---|---|---|
| Alisia Wilcox | Outdoor Gear Co-op | $5,841.36 | $973.56 | $5,841.36 |
| Ashley McCormick | By A Thread | $5,226.48 | $871.08 | $5,226.48 |
| | Jack and Jill Climbing School & Supplies | $2,613.24 | $435.54 | $2,613.24 |
| Bart Scott | By A Thread | $5,072.76 | $845.46 | $5,072.76 |
| Chad Michaels | Outdoor Gear Co-op | $6,148.80 | $1,024.80 | $6,148.80 |
| Dale Fowler | Donovan's Sports | $2,305.80 | $384.30 | $2,305.80 |
| | Falcon Outfitters | $3,381.84 | $563.64 | $3,381.84 |
| Eric Carson | Connor Department Store | $2,766.96 | $461.16 | $2,766.96 |
| | Edward's Department Store | $5,072.76 | $845.46 | $5,072.76 |
| Harold Germaine | Outdoor Gear Co-op | $1,537.20 | $256.20 | $1,537.20 |
| Janice Thomas | Donovan's Sports | $2,459.52 | $409.92 | $2,459.52 |

Figure 9

METHOD AND SYSTEM FOR MANAGING EXEMPLAR TERMS DATABASE FOR BUSINESS-ORIENTED METADATA CONTENT

FIELD OF INVENTION

The present invention relates to a metadata content management and searching system and method, especially to a method and system for creating an exemplar terms database from business-oriented metadata content.

BACKGROUND OF THE INVENTION

Competitive economies motivate business managers and other users to obtain maximum value from their investments for Corporate Performance Management (CPM) tools, such as Business Intelligence (BI) tools, that are used to manage business oriented data and metadata. These CPM tools provide authored reports or authored drill-through targets to link content together. Users often encounter problems in finding important reports or relevant data or drilling to related content if it was not previously authored.

Traditional search technologies often provide incomplete or irrelevant results in the CPM environments. There are metadata search tools that run against relational databases. They can fail to find relevant data since they only search databases and do not leverage a customer's investment in CPM tools and applications. Relying on authored drill-through targets can also be problematic as new cube, reports, metrics or plans are added since new drill targets are not always kept up-to-date. Users can have difficulties moving seamlessly between CPM tools or applications, particularly when CPM applications are created by different individuals or departments.

It is therefore desirable to provide a mechanism that allows more effective searches of business oriented metadata context.

There exist search engines that use a full-text index combined with statistical methods to create ordered search results. An example of such a search engine is page ranking that is described in U.S. Pat. No. 6,526,440 issued to Bharat. However, these search engines are not sufficient to search complex data like business oriented metadata since they rely on ranking algorithms that work with data found primarily in the Global Internet and not inside a business.

Many existing search engines provide basic full-text search features. Many of these engines use a combination of dictionary, thesaurus and taxonomy components to remove query ambiguities and to provide very limited exemplar term functions.

In those search engines, creation of an exemplar term database is a manual process or an automated process based on advanced linguistic analysis. Each of these systems is potentially expensive to maintain and can produce inconsistent results.

It is therefore desirable to provide a system that manages exemplar terms for business oriented metadata content automatically without the need for manual classification or complicated and potentially inaccurate linguistic analysis.

SUMMARY OF THE INVENTION

It is an object of the invention to provide an improved management system for managing exemplar terms that obviates or mitigates at least one of the disadvantages of existing systems.

The invention uses a content index of source business oriented metadata to manage logical example associations of terms. Exemplar terms may be simply called "examples" herein after.

In accordance with an aspect of the present invention, there is provided an example management system comprising an indexing engine, an index store and an example engine. The indexing engine is provided for indexing content of source business oriented metadata. The indexing engine has a content scanner for reading the business oriented metadata, and builds a content index of the business oriented metadata. The index store is provided for storing the content index of the business oriented metadata. The example engine is provided for managing logical associations of terms in a query using the content index.

In accordance with another aspect of the invention, there is provided a method of managing example associations of terms for a search component. The method comprises the steps of reading source business oriented metadata; indexing content of the source business oriented metadata; building a content index of the source business oriented metadata; and managing logical associations of terms in a query using the content index.

In accordance with another aspect of the invention, there is provided a computer readable medium storing instructions or statements for use in the execution in a computer of a method of managing example associations of terms for a search component. The method comprises the steps of reading source business oriented metadata; indexing content of the source business oriented metadata; building a content index of the source business oriented metadata; and managing logical associations of terms in a query using the content index.

In accordance with another aspect of the invention, there is provided a propagated signal carrier carrying signals containing computer executable instructions that can be read and executed by a computer, the computer executable instructions being used to execute a method of managing example associations of terms for a search component. The method comprises the steps of reading source business oriented metadata; indexing content of the source business oriented metadata; building a content index of the source business oriented metadata; and managing logical associations of terms in a query using the content index.

This summary of the invention does not necessarily describe all features of the invention.

BRIEF DESCRIPTION OF THE DRAWINGS

These and other features of the invention will become more apparent from the following description in which reference is made to the appended drawings wherein:

FIG. 7 is a diagram showing an example of a report and user interface display by the metadata content management system;

FIG. 8 is a diagram showing another example of a report and user interface display by the metadata content management system;

FIG. 9 is a diagram showing another example of a report and user interface display by the metadata content management system;

DETAILED DESCRIPTION OF PREFERRED EMBODIMENTS

Figure 1:
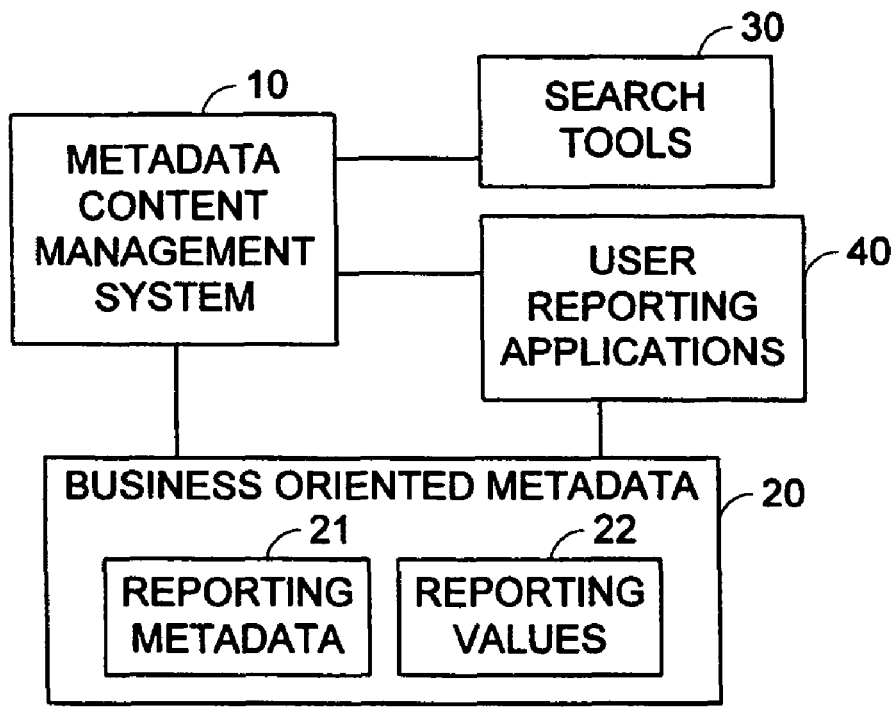
FIG. 1 is a block diagram showing a metadata content management system in accordance with an embodiment of the present invention.

Referring to FIG. 1, a metadata content management system 10 in accordance with an embodiment of the invention is described. The metadata content management system 10 is suitably used for an enterprise or other organization that has sources of business oriented information, i.e., business oriented metadata 20. The metadata content management system 10 interacts with the business oriented metadata 20, as well as one or more search tools or components 30 and user reporting applications 40 used by the organization.

An organization typically has untapped sources of information, e.g., business oriented metadata 20 including reporting metadata 21 and specifications and key report values 22 of the user reporting applications 40. The business oriented metadata 20 includes OLAP and dimensional business data defined by the user reporting applications 40. These information, metadata and values may be collectively called as business oriented metadata 20 in this specification.

The metadata content management system 10 indexes the content of the business oriented metadata 20. It analyzes the business oriented metadata 20 to create a search index. Since the search index is created from the organization's metadata 20, it is suitable for the organization. By providing such a search index, the metadata content management system 10 promotes navigation between BI tools 30 and reporting applications 40, creating a strategic view of CPM assets. The metadata content management system 10 captures application context, e.g., "viewing location" or "query parameters", by creating the search index from the reporting metadata 21. The search index created by the metadata content management system 10 enables many unique navigation options beyond traditional folder browsing and text searching.

Figure 6:
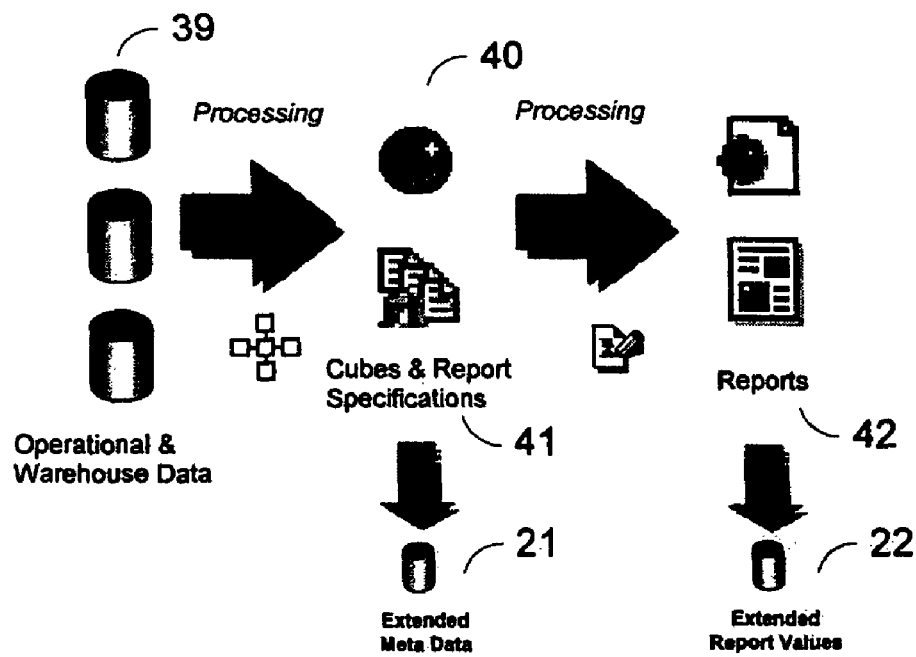
FIG. 6 is a diagram showing metadata and report values.

As shown in FIG. 6, a typical organization has various data sources 39, such as operational databases and/or data warehouses, and several CPM tools or user reporting applications 40 that create cubes and/or report specifications 41 and generate reports 42. Reporting metadata 21 and associated values 22 are produced by those applications 40. Other business oriented metadata may be exported from metadata modeling tools. While authoring reports in reporting applications 40, the creation of new hierarchies and data definitions occur. These hierarchies and data definitions are useful for drilling and searching. This data is often more recognizable to end-users since this is the data or text that the users see in applications 40 and their reports 41. These metadata and report data are considered as extended metadata 21 to describe the metadata created by different authoring and processing phases. Extended report data 22 refers to values created in a similar fashion.

These extended metadata 21 and report data 22 can be viewed as new BI data or business oriented metadata 20 of the organization. The metadata content management system 10 leverages the new BI data 20 to provide searching and drilling that was previously unavailable in existing systems, as described below.

Examples of extended metadata 21 added by the authoring process includes dimension names, dimension levels, category names, alternate category names, cube hierarchies, table and record names, group names, parent/child relationships between categories, groups or tables, authored drill target names, CPM tool's model entities such as packages, namespaces, query items, query sources and relevant authored relationships. Examples of extended authored report values 22 include items related by one of more dimensions, categories, measures groups or tables, calculated values, and annotations.

For example, a BI tool may provide dimensional business data, such as crosstable providing dimension, category and measure names. These names represent extended metadata 21. These names may or may not match table/column names in a star schema or other relational model. Yet each of these names represents an important potential target for drilling or searching. Values stored in a cube, including calculated values, represent extended data or values 22. They are a valuable target for searching. Like extended metadata 21, many of these values 22 are not found in any other data store.

Another example of a reporting tool 40 may provide a report with columns. In such a report, each of the column heading represents extended metadata 21. The report grouping, e.g., by country, represents another form of extended metadata 21. Report values themselves represent extended report data 22. They offer important linking and search targets.

In these cases, the extended metadata names are the same as those viewed by the report user. Thus, these extended metadata names are often most relevant and recognizable to the report user. Using these metadata names allows the metadata content management system 10 to provide information relevant and recognizable to the report user. These metadata names may or may not match the names used in the underlying databases.

Authored links, such as those anchored to the column name "Sales Rep Name", provide additional summary information about the linked reports. This information also represents extended metadata 21. This information allows the metadata content management system 10 to further increase search relevance about the destination content of the metadata 20 including the metadata 21 or report values 22.

The metadata content management system 10 indexes content of the business oriented metadata 20 and generates a content index or index corpus which is a searchable database of representations of the content of the business oriented metadata 20, as further described below.

Research related to data searching and linking technologies commonly identifies two basic types of data: structured data and unstructured data. Structured data is defined by a formal schema. Typically structured data is searched with utilities of Online Analytical Processing (OLAP), Structured Query Language (SQL) and eXtensible Markup Language (XML). Unstructured data is normally found in documents and static web pages. Typically unstructured data is searched using free-form queries with web tools, such as Google™.

The metadata content management system 10 provides searching functions over both types of data by using the content index of the business oriented metadata 20. Structured data searches are used to implement report-to-report drilling. This includes listing selecting from multiple targets. The metadata content management system 10 may use a search engine to handle structured data searches. Full-text searches are used to find reports for unstructured user queries. The metadata content management system 10 typically handles full-text search by interacting with external search tools 30 (FIG. 1). For example, searches launched from Internet Information Services (IIS) or Portal text search tools are full-text searches.

The content index provides various advantages. The metadata content management system 10 enhances search and drill-through capabilities across the range of user report applications 40 without requiring drill-through authoring in source content. A report author simply publishes target reports and lets the metadata content management system 10 find drill locations to the target content.

The metadata content management system 10 organizes business oriented metadata content in ways that are more relevant and meaningful to users. The metadata content management system 10 also includes several personalization and administration options.

The metadata content management system 10 describes data using names and labels from actual reports. These names are often more familiar and relevant to report users. The metadata content management system 10 also provides enhanced report-to-report drilling and product-to-product navigation. It expands the number of places where report users can "drill-to" and "drill-from" in a report. Most drilling requires no advance authoring. The metadata content management system 10 improves the capabilities of search tools. This includes the concept of 'federated' search across a variety of portal and web search indices.

User reporting applications 40 often generate authored relational and OLAP reports. Those reports provide a wealth of new metadata, including schema information, that is largely hidden from other tools and reporting applications. The metadata content management system 10 exposes this metadata in a standard format that can be re-used by other CPM applications 40 and tools 30.

Figure 2:
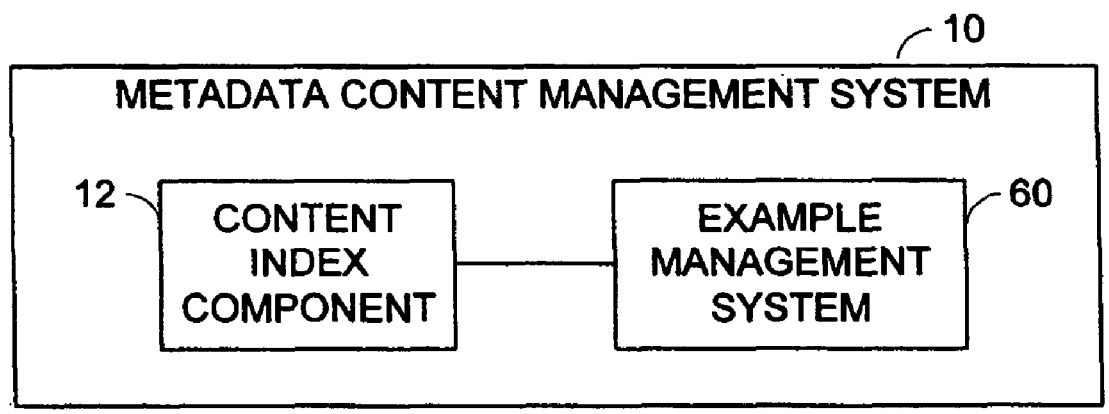
FIG. 2 is a block diagram showing an embodiment of the metadata content management system.

FIG. 2 shows an embodiment of the metadata content management system 10. The metadata content management system 10 has a content index component 12.

The metadata content management system 10 uses indexing so that the metadata content can be searched and organized in real-time. Indexing is normally performed by the metadata content management system 10 when the metadata content is published or updated. Indexing can be performed by a scheduled administrator task (example: nightly cron job). It can also be performed manually by an administrator or user.

Figure 3:
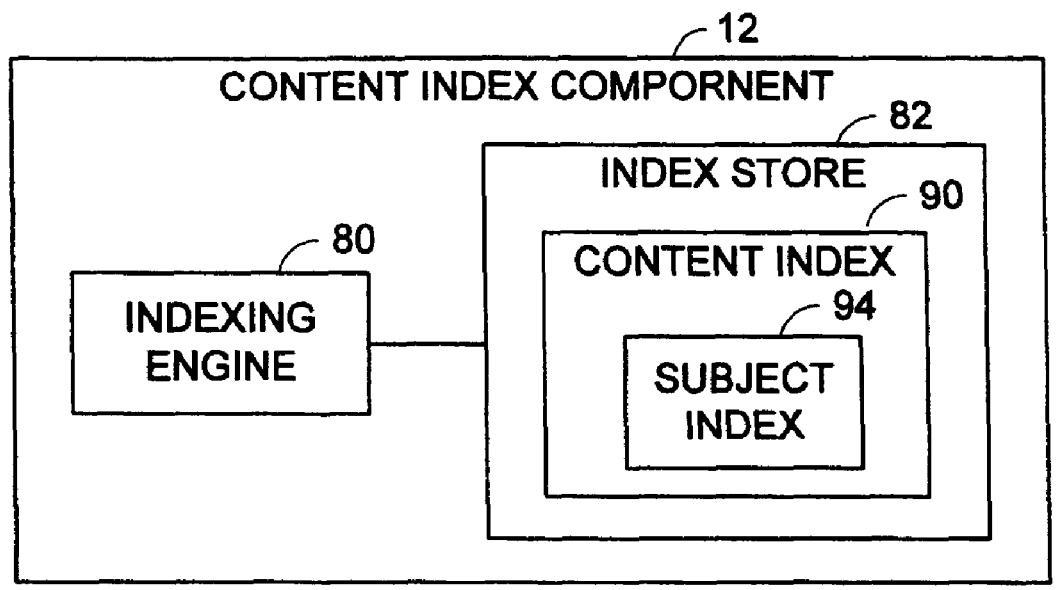
FIG. 3 is a block diagram showing an embodiment of a content index component.

As shown in FIG. 3, the content index component 12 has an indexing engine 80 and an Index store 82. The index store 82 stores files for content index 90. The content index 90 may also be called an index corpus or knowledge base. The content index 90 is a full-text index.

The indexing engine 80 performs indexing of the content of the business oriented metadata 20 for a particular organization. It analyzes the content of the business oriented metadata 20 and creates indexes as described below. Since it creates indexes from the business oriented metadata of the organization, the created indexes are suitable for the organization.

A single set of index files is typically maintained in the index store 82 in the content index component 12 for all users and user groups for the organization. By storing a single set of index files in a single store, the metadata content management system 10 can provide optimal or improved performance. The index store 82 may be part of a server file system of the organization.

A content index 90 is a collection of content indexes. In other words, the content index 90 is a concordance of unique words (called terms) across scanned or indexed content items (called documents). Each content index contains an entry for each term across the indexed documents. Each context index catalogs individual words or terms and stores them along with their usage or other data. Each indexed content term contains a list of the indexed documents that have that term. Each indexed content term also contains usage statistics and the position of the term within each indexed document where possible. A content index is an "inverted index" where each indexed term refers to a list of documents that have the indexed term, rather than each indexed document contains a list of terms as in traditional indexes. The content index 90 provides term searches and links to additional data stored in the content index 90. Each content index may contain, for each content, i.e., target item, information regarding the name or identification of the target item; module, cube or report metadata and their relevant metadata hierarchy; item location in the document folder hierarchy; and/or reference to its dependent model.

A content index may be an XML content index that describes each indexed item in XML. An XML content index stores applicable metadata, metrics and planning information that improve search relevance. Each XML content index is associated with each indexed document. An indexed document is an XML file that catalogs metadata, report values and other reporting application-specific information.

The XML content index items or data are stored in flat files in the index store 82. The index store 82 may be the application server's file system. A relational database can optionally be configured to store this XML content index data. "Read" activity related to XML content index items is low compared to typical full-text index items. Records of XML content index items are read by search tools 30.

While FIG. 3 shows the index store 82 within the content index component 12, the index store 82 may or may not be part of the metadata content management system 10.

The content index 90 may be stored in application server flat files. The content index 90 is typically optimized to minimize disk reads and keep term storage as low as possible. The content index 90 may be stored in a data store of an external full-text search engine. For example, the metadata content management system 10 may use an implementation of an existing full-text engine, e.g., the open source Apache Jakata Lucene full-text engine.

The content index 90 also includes a taxonomy or subject index 94. The subject index 94 may also be called a subject hierarchy, topic hierarchy, topic tree or subject dictionary. The subject index 94 is a collection of indexes, each being a file-based index extension that allows subject hierarchies or taxonomies to be quickly queried. The subject index 94 allows searches of parent topic names for a given term.

Subject hierarchies is typically stored in the subject index 94 in the content index 90. By doing so, the metadata content management system 10 can allow the content index 90 to dynamically produce subject index 94, i.e., subject hierarchies, by searching the content index 90 for, e.g., "parent term relationships" of any word or phrase. This is possible because for a given word, the content index 90 stores references to its parent or parents. A word may have multiple derivations.

As shown in FIG. 2, the metadata content management system 10 also has an example management system 60. The metadata content management system 10 provides searchable metadata and report data in a form of knowledge base documents 54 (FIG. 4) in the content index component 12 using the example management system 60.

Figure 4:
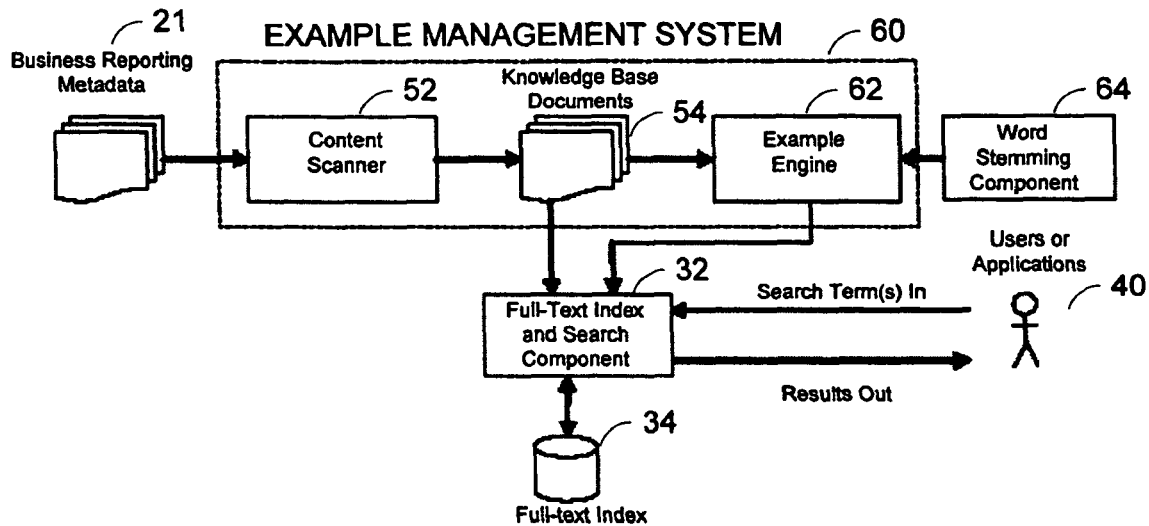
FIG. 4 is a block diagram showing an embodiment of a taxonomy management system.

FIG. 4 shows an embodiment of the example management system 60. The example management system 60 is used for building an exemplar terms database, i.e., a searchable index corpus that includes exemplar terms. The index corpus is stored in the form of knowledge base documents 54. Exemplar terms are embodiments of subject hierarchies.

The example management system 60 improves a search engine 32 by allowing its operators 40 to search using exemplar terms. Exemplar terms are words or phrases that are examples of other terms.

The example management system 60 builds a corpus or database of exemplar terms from business oriented content and then allows these terms to be used with a full-text search engine 32 to extend the domain, relevance and quality of content returned from search queries.

Traditionally, some search engines provide use a combination of thesaurus and taxonomy components to provide support for example terms. Some search engines also use these components to improve results by generating better queries that are refinements of operator input. Creation of thesauri and taxonomies is a manual process or an automated process based on advanced linguistic analysis. Each of these systems is potentially expensive to maintain and can produce inconsistent results.

The example management system 60 uses the structure of business reporting metadata extracted from reports and other documents to create a living, de facto example term corpus for a given business entity. Processing is completed automatically without human intervention. The example management system 60 uses a deterministic algorithm or method that provides reliable results without the need for complicated and potentially inaccurate linguistic analysis, as further described below.

As shown in FIG. 4, the example management system 60 comprises a content scanner 52, a knowledge-base documents 54 and an example engine 62.

The example management system 60 interacts with external components including business reporting metadata 21, a full-text index and search component 32, end-users or applications 40. Users and applications 40 (operators 40) are consumers of the example management system 60. While FIG. 4 shows business reporting metadata 21 only as source metadata, the example management system 60 may also use other business oriented metadata 20.

The example management system 60 may also interact with a word stemming component 64. The word stemming component 64 may be available software that is capable of normalizing words to their base form. It removes pluralization, capitalization, punctuation and common stop words to produce a unique base terms where possible. Examples of "stemming" are: "Horses" is normalized to "horse"; "Geese" is normalized to "goose"; "The Days of Specialists" is normalized to "day specialist"; and "Functions aren't comments" is normalized to "function not comment". Stemming may or may not be a part of the example management system 60. It serves to reduce knowledge base and index sizes. It can also improve system performance.

FIG. 4 shows the flow of information between these components.

The content scanner 52 reads source metadata documents containing business reporting metadata 21, and proceeds to produce knowledge base documents 54 from the content that it reads, as described above. Subsequent processes can be run to update the knowledge base documents 54. The content scanner 52 may be part of the indexing engine 80. The knowledge-base documents 54 form the content index 90.

The business reporting metadata 21 is metadata that exists anywhere in a given business or organization. The business reporting metadata 21 typically includes OLAP and dimensional business data. For example, the business reporting metadata 21 may be derived or extracted from reports and other documents as described above. Reports and other documents are metadata documents, i.e., documents containing business oriented metadata, that define query, layout, labeling and annotation of other content. Examples of metadata documents include business reporting and analysis metadata documents authored with report authoring and creation tools, such as business intelligence application suites; business modeling and optimization metadata documents; budgeting, planning and forecasting metadata documents; and financial consolidation metadata documents.

The knowledge-base documents 54 contain word-to-document associations. It may considered as a word-to-document association table. For a given word, the knowledge-base documents 54 have references to each document that has the word, as well as the subject associations defined as described above. The example engine 62 provides the word-to-document associations to the full-text index 34 on demand of users 40. The full-text index 34 ultimately uses examples to provide better searches to its users 40.

The example engine 62 is further described in detail. The example engine 62 uses the structure of the business reporting metadata 21 represented in the knowledge base documents 54 to determine associations among terms and documents. The determined associations are stored in the knowledge base documents 54. An example of a subject hierarchy is described for a system in which the term "Cost" is used as a Measure with names: Billing Cost, Average Billing Cost, Average Billing Cost per Customer, Average Billing Cost per Product, and Actual Cost. Also, it is used as a Report Columns/Heading with names: Product Cost, Planned Total Cost, and Cost of Goods Sold. The example management system 60 is thus a "subject hierarchy aware" system. Any of these subjects can be used to help find more relevant results for the otherwise ambiguous term "Cost". The example engine 62 uses these associations to qualify any given search term as an example of that term, and give to the result to a search engine 32. In a different embodiment, the example engine 62 may provide these associations to a search engine 32 to allow it to qualify any given search term as an example of that term based on these associations.

The example engine 62 improves the indexing capabilities of a standard full-text indexing system 32. The example engine 62 creates logical associations between terms that are used to efficiently answer the queries, such as "What terms are examples of Term A?", and "Is Term B an example of Term A?".

By combining terms into phrases and querying each term independently with one or more of the queries from above, the example engine 62 answers questions, e.g., "Is Phrase B an example of Phrase B?".

The example engine 62 may optionally use word stemming from the word stemming component 64 to improve performance and accuracy.

Figure 5:
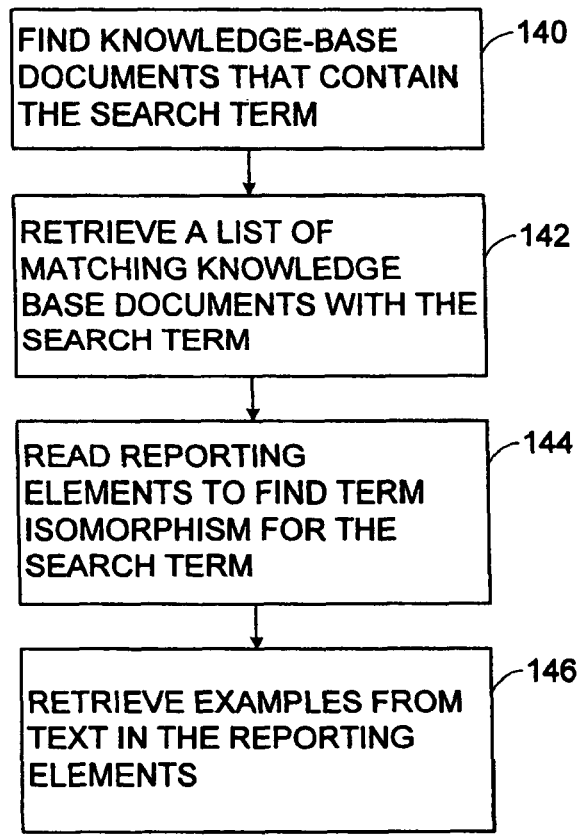
FIG. 5 is a flowchart showing an embodiment of the procedure for determining parent topic terms.

FIG. 5 shows the example processing. The example engine 62 finds examples for a given search term by searching the knowledge base documents 54 for documents that contain the given search term (130). The example engine 62 retrieves a list of documents with the given search term for further processing (132). The example engine 62 reads the reporting elements, e.g., XML elements, in each matching knowledge base document 54 to find Term Isomorphisms (equivalent structures) for the given search term (134). The example engine 62 retrieves examples from text in the reporting elements (136). The example engine 62 may include in query results, prompt value pick-list, child elements and/or links. These are specific source data instances where example data can be extracted". For example, examples may be extracted from various types of headings.

In a different embodiment, the content scanner 52 may be combined with a full-text index scanner that indexes terms, determines example terms in one integrated component. A sophisticated embodiment of a full-text index and search service may integrate itself with the example component or engine 62.

As described above, the metadata content management system 10 maintains a list of examples for terms and subjects, using the example management system 60. This extends the number of possible matches, particularly in enterprise environments, where several names can be used for the same thing.

An example of reporting by example is now described. In this example, a product manager wants to know who provides customer support for a particular product at different US retailers. The product manager gives search terms to the metadata content management system 10. She does not remember the exact product name spelling, and she only remembers its short form from other reports she has seen. She uses the term USA for United States and she is not particular about spacing or capitalization. In each case, she is providing examples of report metadata, not the metadata itself. On her first try, she types: "USA CM backpack staff details".

The metadata content management system 10 takes her request and matches metadata:

USA=United States=Location

CM backpack=Canyon Mule Climber Backpack=Product

The terms staff details did not match any metadata. Instead it matched a Report Detail template for an authored report. With the majority of information collected, the metadata content management system 10 simply asks for business role as shown in FIG. 7.

She selects the Product Manager role and clicks Finish to get her answer. The metadata content management system 10 builds and runs a report, as shown in FIG. 8.

She looks at the report and notices the information is correct except that all reporting years are included. She wants only year 2004. She returns to the original search page and adds "2004" so that the search terms are "USA CM backpack staff details 2004".

The metadata content management system 10 builds and runs a new report as shown in FIG. 9. The product manager looks at the answer and is satisfied.

Figure 10:
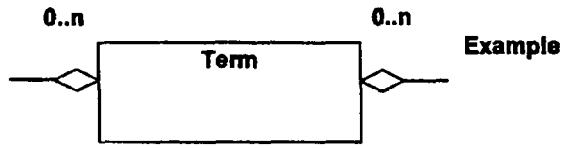
FIG. 10 is a diagram showing another example of a report and user interface display by the metadata content management system.

In this example, the metadata content management system 10 carried out matching metadata based on unstructured terms, which are aliased or even misspelled, is not a linguistic exercise, by using the indexing data structure. For each metadata model element, the metadata content management system 10 indexes the following information as shown in FIG. 10. This means that for each indexed term there exists zero or more aliases or synonymous and zero or more examples. For example, consider an element called: "Product". Aliases are obtained from actual published report column heading and titles that use the element Product. Indexed Alias values include things like Product List, Product Names, and Prod. Nam. Examples are obtained from running actual queries to get values for this element. Indexed Example values will typically include things like Star-Lite Tent, RayBan Sun Screen, and Elvis Retro Sunglasses. From the values shown in this example, we can determine that a user has entered a Product when they type "star-lite tent", "Prod Nam" or "Elvis sunglasses".

Hyper-Dimensional Navigation uses a Bar to find content quickly and easily. When a product manager wants to know who provides customer support for a particular product at different US retailers, she enters the two phrases that she feels are most prominent and intends to narrow her search from there. She types: "2004 United States".

Figure 11:
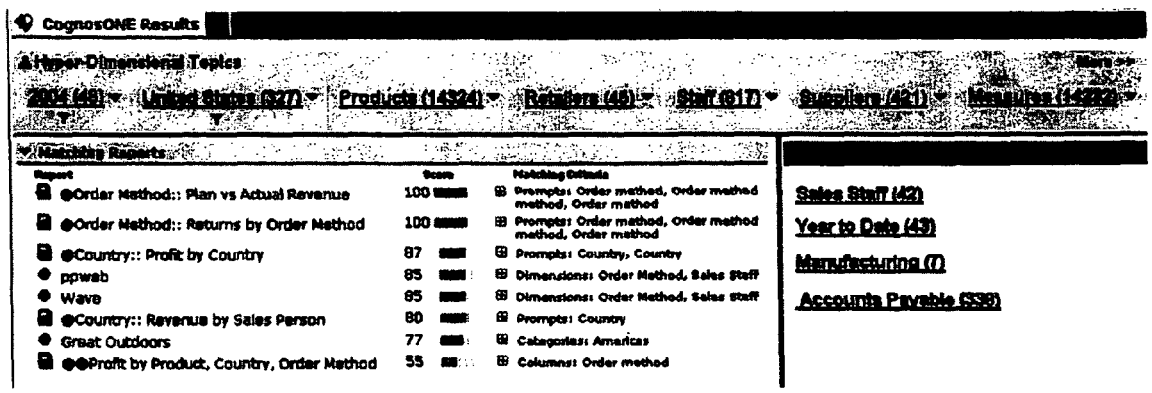
FIG. 11 is a diagram showing another example of a report and user interface display by the metadata content management system.

Initial search results show matching reports (as expected) with 2 new frames entitled: Hyper-Dimensional Topics and Related Topics, as shown in FIG. 11.

Hyper-Dimensional Topics show the number of reports filtered by 2004 and United States. Other enterprise-wide dimensions are shown with the number of reports that contain some reference to that dimension. Clicking on any listed item shows a context menu that lists children and parents across all indexed content.

Related Topics shows parent and sibling dimensions that are related to current filters.

Figure 12:
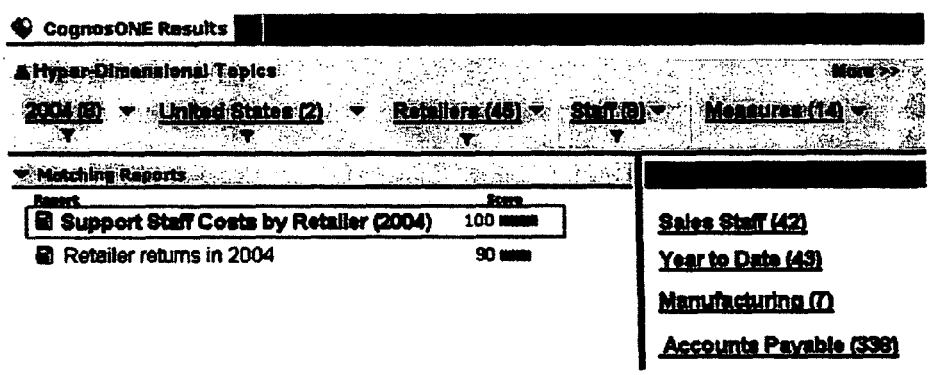
FIG. 12 is a diagram showing another example of a report and user interface display by the metadata content management system.

To find reports related to retailers and staff, she clicks Retailer and Staff items in Hyper-Navigation bar. This effectively searches for reports that deal with 2004 (selected previously), United States (selected previously) Retailer and Staff creating a "topic crosstab". The new search results show the number of reports matching the selected criteria, as shown in FIG. 12. The exact report she is looking for is listed first under the heading Matching Reports.

The example management system of the present invention may be implemented by any hardware, software or a combination of hardware and software having the above described functions. The software code, instructions and/or statements, either in its entirety or a part thereof, may be stored in a computer readable memory. Further, a computer data signal representing the software code, instructions and/or statements may be embedded in a carrier wave may be transmitted via a communication network. Such a computer readable memory and a computer data signal and/or its carrier are also within the scope of the present invention, as well as the hardware, software and the combination thereof.

While particular embodiments of the present invention have been shown and described, changes and modifications may be made to such embodiments without departing from the scope of the invention. For example, the elements of the example management system are described separately, however, two or more elements may be provided as a single element, or one or more elements may be shared with other components in one or more computer systems.

What is claimed is:

1. An example management system, comprising:
    at least one computer;
    an indexing engine executable by the at least one computer to index content of source business oriented metadata, the source business oriented metadata including an authored topic hierarchy, the indexing engine having a content scanner that reads the source business oriented metadata included in source metadata documents containing terms to be indexed, and builds a content index of the source business oriented metadata, wherein the content scanner builds, as the content index, one or more knowledge base documents, wherein, for each term in the source metadata documents, the content scanner stores, in the one or more knowledge base documents, a knowledge base representation of the term along with one or more references to content of the source business oriented metadata that uses the term, and wherein the one or more knowledge base documents include a representation of a structure of the authored topic hierarchy;
an index store that stores the content index of the source business oriented metadata; and
an example engine executable by the at least one computer to use the representation of the structure of the authored topic hierarchy to determine logical associations among the terms in the source metadata documents, store the logical associations in the one or more knowledge base documents, and manage logical associations of terms in a query using the one or more knowledge base documents of the content index, wherein the example engine determines an example association between two terms when a term is an example of another term, and wherein the example engine combines terms into phrases and determines, based on example associations between terms in the phrases, an example association between two phrases when a phrase is an example of another phrase.

2. The example management system as claimed in claim 1, wherein the example engine locates relevant knowledge base documents relevant to the terms in the query, and determines the logical associations between terms in the query based on the relevant knowledge base documents.

3. The example management system as claimed in claim 1, wherein the example engine dynamically determines the logical associations of terms in the query upon receipt of the query from a search component, and provides the logical associations to the search component.

4. The example management system as claimed in claim 1, wherein the example engine interacts with a word stemming component that stems one or more terms in the query to manage logical associations of the terms based on the stemmed terms.

5. The example management system as claimed in claim 2, wherein the example engine locates the relevant knowledge base documents by searching for knowledge base documents containing each term in the query, each of the one or more knowledge base documents containing a list of source metadata documents using the term in the query, and reads the relevant knowledge base documents to find term isomorphisms for the terms in the query to retrieve examples from the relevant knowledge base documents.

6. The example management system as claimed in claim 2, wherein
the content scanner includes, in the one or more knowledge base documents, reporting elements included in the source metadata documents, and
the example engine determines example associations of terms using the reporting elements included in the relevant knowledge base documents.

7. The example management system as claimed in claim 2, wherein
the content scanner builds the one or more knowledge base documents to contain one or more term-to-document associations indicating one or more source business oriented metadata documents that contain the term,
the example engine determines example associations of terms in the query using the term-to-document associations in the relevant knowledge base documents.

8. The example management system as claimed in claim 2, wherein
the content scanner uses a structured hierarchy of reporting elements of the source business oriented metadata to include, in the one or more knowledge base documents, one or more references indicating parent/child relations between the term and the content of the source business oriented metadata, and
the example engine determines example associations of terms using the references indicating the parent/child relations included in the relevant knowledge base documents.

9. The example management system as claimed in claim 2, wherein
the content scanner includes, in the one or more knowledge base documents, one or more links to other content of the source business oriented metadata, and
the example engine determines example associations of terms using the links included in the relevant knowledge base documents.

10. The example management system as claimed in claim 3, wherein the example management system includes the word stemming component.

11. The example management system as claimed in claim 2, wherein
the content scanner includes, in the one or more knowledge base documents, a prompt value pick-list, and
the example engine determines example associations of terms using the prompt value pick-list included in the relevant knowledge base documents.

12. A method of managing associations of terms for a search component, the method comprising:
reading source business oriented metadata, wherein the source business oriented metadata is included in source metadata documents containing terms to be indexed, and wherein the source business oriented metadata includes an authored topic hierarchy;
indexing content of the source business oriented metadata;
building, with a computer, a content index of the source business oriented metadata, wherein building the content index comprises, for each term in the source metadata documents, generating a knowledge base representation of the term, and storing, in one or more knowledge base documents, the knowledge base representation of the term along with one or more references to content of the source business oriented metadata that uses the term, and wherein the one or more knowledge base documents include a representation of a structure of the authored topic hierarchy;
using the representation of the structure of the authored topic hierarchy to determine logical associations among the terms in the source metadata documents;
storing the logical associations in the one or more knowledge base documents; and
managing logical associations of terms in a query using the one or more knowledge base documents of the content index, wherein managing the logical associations comprises determining an example association between two terms when a term is an example of another term, combining terms into phrases and determining, based on example associations between terms in the phrases, an example association between two phrases when a phrase is an example of another phrase.

13. The method as claimed in claim 12, wherein reading the source business oriented metadata comprises reading the source business oriented metadata that includes at least one of Online Analytical Processing (OLAP) hypercubes, report query specifications and reports.

14. The method as claimed in claim 12, wherein managing the logical associations comprises:
locating relevant knowledge base documents relevant to the terms in the query, and determining the logical associations between terms in the query based on the relevant knowledge base documents.

15. The method as claimed in claim 12, wherein managing the logical associations comprises:
receiving the query from a search component;
dynamically determining the logical associations of terms in the query; and
providing the logical associations to the search component.

16. The method as claimed in claim 12, wherein managing the logical associations further comprises stemming one or more terms in the query to manage logical associations of the terms based on the stemmed terms.

17. The method as claimed in claim 14, wherein managing the logical associations comprises:
locating the relevant knowledge base documents by searching for knowledge base documents containing each term in the query, each of the one or more knowledge base documents containing a list of source metadata documents using the term in the query;
reading the relevant knowledge base documents;
finding term isomorphisms for the terms in the query; and
retrieving examples from the relevant knowledge base documents.

18. The method as claimed in claim 14, wherein
building the content index comprises including, in the one or more knowledge base documents, reporting elements included in the source metadata documents, and
managing the logical associations comprises determining example associations of terms using the reporting elements included in the relevant knowledge base documents.

19. The method as claimed in claim 14, wherein
building the content index comprises building the one or more knowledge base documents to contain one or more term-to-document associations indicating one or more source business oriented metadata documents that contain the term, and
managing the logical associations comprises determining example associations of terms in the query using the term-to-document associations in the relevant knowledge base documents.

20. The method as claimed in claim 14, wherein
building the content index comprises using a structured hierarchy of reporting elements of the source business oriented metadata to include, in the one or more knowledge base documents, one or more references indicating parent/child relations between the term and the content of the source business oriented metadata, and
managing the logical associations comprises determining example associations of terms using the references indicating the parent/child relations included in the relevant knowledge base documents.

21. The method as claimed in claim 14, wherein
building the content index comprises including, in the one or more knowledge base documents, one or more links to other content of the source business oriented metadata, and
managing the logical associations comprises determining example associations of terms using the links included in the relevant knowledge base documents.

22. The method as claimed in claim 14, wherein
building the content index comprises including, in the one or more knowledge base documents, a prompt value pick-list, and
managing the logical associations comprises determining example associations of terms using the prompt value pick-list included in the relevant knowledge base documents.

23. A computer readable medium storing instructions that cause a computer to:
read source business oriented metadata, wherein the source business oriented metadata is included in source metadata documents containing terms to be indexed, and wherein the source business oriented metadata includes an authored topic hierarchy;
index content of the source business oriented metadata;
build a content index of the source business oriented metadata, wherein the instructions that cause the computer to build the content index comprise instructions that cause the computer to, for each term in the source metadata documents, generate a knowledge base representation of the term, and store, in one or more knowledge base documents, the knowledge base representation of the term along with one or more references to content of the source business oriented metadata that uses the term, and wherein the one or more knowledge base documents include a representation of a structure of the authored topic hierarchy;
use the representation of the structure of the authored topic hierarchy to determine logical associations among the terms in the source metadata documents;
store the logical associations in the one or more knowledge base documents; and
manage logical associations of terms in a query using the one or more knowledge base documents of the content index, wherein the instructions that cause the computer to manage the logical associations comprise instructions that cause the computer to determine an example association between two terms when a term is an example of another term, combine terms into phrases and determine, based on example associations between terms in the phrases, an example association between two phrases when a phrase is an example of another phrase.

* * * * *